US012479659B2

(12) United States Patent
Whelan

(10) Patent No.: US 12,479,659 B2
(45) Date of Patent: Nov. 25, 2025

(54) LOAD HANDLING SYSTEM

(71) Applicant: Ocado Innovation Limited, Hatfield (GB)

(72) Inventor: Matthew Whelan, Hatfield (GB)

(73) Assignee: OCADO INNOVATION LIMITED, Hatfield (GB)

(\*) Notice: Subject to any disclaimer, the term of this patent is extended or adjusted under 35 U.S.C. 154(b) by 182 days.

(21) Appl. No.: 18/250,871

(22) PCT Filed: Oct. 21, 2021

(86) PCT No.: PCT/EP2021/079234
§ 371 (c)(1),
(2) Date: Apr. 27, 2023

(87) PCT Pub. No.: WO2022/090053
PCT Pub. Date: May 5, 2022

(65) Prior Publication Data
US 2023/0391548 A1 Dec. 7, 2023

(30) Foreign Application Priority Data
Oct. 28, 2020 (GB) ...................................... 2017106

(51) Int. Cl.
 *B65G 1/04* (2006.01)
 *B65D 88/58* (2006.01)
 *E04H 6/18* (2006.01)
(52) U.S. Cl.
 CPC .......... *B65G 1/0464* (2013.01); *B65D 88/58* (2013.01); *E04H 6/188* (2013.01)
(58) Field of Classification Search
 CPC .... B65G 1/0464; B65G 1/0457; B65D 88/58; E04H 6/188; E04H 6/181; E04H 6/22
 See application file for complete search history.

(56) References Cited

U.S. PATENT DOCUMENTS 3,474,803 A \* 10/1969 Davis ........................ E04H 6/04
135/912
5,176,484 A 1/1993 Kuperman et al.
(Continued)

FOREIGN PATENT DOCUMENTS

| CN | 109594815 A | 4/2019 |
| DE | 102008011537 A1 | 9/2009 |

(Continued)

OTHER PUBLICATIONS

First Office Action issued on Jun. 25, 2024, by the Japanese Patent Office in corresponding Japanese Patent Application No. 2023-526075, and an English Translation of the Office Action. (4 pages).

(Continued)

*Primary Examiner* — Kaitlin S Joerger
(74) *Attorney, Agent, or Firm* — Buchanan Ingersoll & Rooney PC

(57) ABSTRACT

This disclosure relates to a load handling system including a container having a load carrying platform and a side wall extending around at least part of the perimeter of the load carrying platform. The side wall is to move with respect to the load carrying platform between a first position in which the load carrying platform is held substantially at a lower end of the side wall and a second position in which the load carrying platform is located substantially at or above an upper end of the side wall. The load handling system is configured to receive the side wall as the side wall moves after the load carrying platform has been lowered onto the support station.

12 Claims, 8 Drawing Sheets

(56) References Cited

U.S. PATENT DOCUMENTS

| | | | |
|---|---|---|---|
| 10,407,233 B1* | 9/2019 | Town | B65D 88/542 |
| 2021/0188545 A1* | 6/2021 | Hognaland | B65G 1/1378 |
| 2023/0109767 A1* | 4/2023 | Heggebø | B65D 21/0213 |
| | | | 700/218 |

FOREIGN PATENT DOCUMENTS

| | | |
|---|---|---|
| EP | 0758706 A1 | 2/1997 |
| EP | 1285867 A2 | 2/2003 |
| GB | 2570984 A | 8/2019 |
| GB | 2584180 A | 11/2020 |
| WO | 2016166306 A1 | 10/2016 |
| WO | 2017217920 A1 | 12/2017 |
| WO | 2022090053 A1 | 5/2022 |

OTHER PUBLICATIONS

Office Action issued on May 22, 2023, by the Great Britain Patent Office in corresponding Great Britain Patent Application No. GB2115096.6. (4 pages).

International Search Report (PCT/ISA/210) and Written Opinion (PCT/ISA/237) mailed on Feb. 8, 2022, by the European Patent Office as the International Searching Authority for International Application No. PCT/EP2021/079234. (12 pages).

Search Report mailed on Apr. 20, 2021, by the United Kingdom Patent Office for Application No. GB2017106.2.(1 page).

Office Action (Examination Report No. 1) issued on Mar. 28, 2024, by the Australian Patent Office in corresponding Australian Patent Application No. 2021367818. (4 pages).

Office Action (Request for the Submission of an Opinion) issued on Sep. 13, 2024, by the Korean Patent Office in corresponding Korean Patent Application No. 10-2023-7017134, and an English Translation of the Office Action. (8 pages).

Office Action issued on Aug. 15, 2024, by the Canadian Patent Office in corresponding Canadian Patent Application No. 3,198,222. (5 pages).

Search Report issued on Apr. 13, 2022, by the Great Britain Patent Office in corresponding Great Britain Application No. GB2115096.6. (4 pages).

Office Action issued on May 5, 2025 by the European Patent Office in corresponding European Application No. 21798986.2 (5 pages) corresponding to Applicant's U.S. Appl. No. 18/250,871.

* cited by examiner

LOAD HANDLING SYSTEM

This disclosure relates to a load handling system. More specifically, it relates to a load handling system in which a container for carrying a load is passively actuated for the receipt or delivery of the load. Aspects of the invention relate to the load handling system itself and a container thereof.

BACKGROUND

Some commercial and industrial activities require systems that enable the repeated storage and retrieval of large numbers of products. Examples of such systems include automated car parking systems which use load handling systems comprising containers or the like suitable for carrying a variety of different vehicles between a storage location within the parking system and a collection point. The containers often have complex actuation systems (e.g., electromechanical systems) comprising multiple moving elements working in conjunction to enable their access at the collection point and also provide a safe storage space. These actuation systems often interface with other systems at the collection point in order to carry out their function. The complexity of these systems means that they are expensive to purpose and maintain. Therefore, there would be significant benefits if the complexity of these systems were reduced. As such, there is a perceived need for an alternative load handling system comprising a container that can be actuated without the need for a complex actuation system.

SUMMARY

The invention accordingly provides, in a first aspect, a load handling system comprising a container having a load carrying platform and a side wall extending around at least part of the perimeter of the load carrying platform, the side wall being configured to move with respect to the load carrying platform between a first position in which the load carrying platform is held substantially at a lower end of the side wall and a second position in which the load carrying platform is located substantially at or above an upper end of the side wall. The load handling system further comprises lifting means, connectable to the side wall for carrying the container in substantially vertical directions, and a base. The base comprises a support station and a cavity, the cavity being configured to receive the side wall as the side wall moves from the first position to the second position when the lifting means continues to lower the container after the load carrying platform has been lowered onto the support station such that the load carrying platform is accessible to a load positioned on the base.

Optionally, the side wall extends around the entire perimeter of the load carrying platform.

Alternatively, the side wall extends along a first pair of opposing sides of the load carrying platform. In which case, the load carrying platform may include two direction control ramp surfaces, each direction control ramp surface being associated with a respective side of a second pair of opposing sides of the load carrying platform.

Optionally, the side wall comprises a seating member against which the load carrying platform abuts to hold it at the lower end of the side wall.

Optionally, the side wall comprises guide members for guiding the relative movement between the side wall and load carrying platform.

Optionally, the load carrying platform further comprises a deformable flap arranged to extend across at least part of an opening of the cavity.

Optionally, the container further comprises corner brackets at the upper end of the side wall, the corner brackets being arranged to sit on an upper surface of the load carrying platform when the side wall is in the second position.

Optionally, the container further comprises a frame outwardly extending from the upper end of the side wall, the frame being arranged to cover the opening of the cavity when the side wall is in the second position.

Optionally, the frame extends over the opening of the cavity to sit on the base when the side wall is in the second position to prevent any further downward movement of the side wall with respect to the load carrying platform.

Optionally, the frame comprises a ramped surface leading up to an upper surface of the load carrying platform.

Optionally, the frame comprises a mounting surface configured to receive the lower end of another container's side wall such that the containers can be stacked.

In a second aspect, the invention provides a container for a load handling system according to the first aspect.

BRIEF DESCRIPTION OF THE DRAWINGS

These and other aspects of the invention will now be described, by way of example only, and with reference to the accompanying drawings, in which.

In the figures, like features are denoted by like reference signs.

DETAILED DESCRIPTION

In the following description, some specific details are included to provide a thorough understanding of the disclosed embodiment. One skilled in the relevant art, however, will recognise that other embodiments may be practiced without one or more of these specific details, or with other methods, components, materials, etc. In some instances, well-known structures associated with load handling systems, such as processors, sensors, storage devices, network interfaces, workpieces, tensile members, fasteners, electrical connectors, mixers, and the like are not shown or described in detail to avoid unnecessarily obscuring descriptions of the disclosed embodiments.

Unless the context requires otherwise, throughout the specification and the appended claims, the word "comprise" and variations thereof, such as, "comprises" and "comprising" are to be construed in an open, inclusive sense that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrase "in one embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a system including "a load handling device" includes a load handling device, or two or more load handling devices. It should also be noted that the term "or" is generally employed in its sense including "and/or" unless the content clearly dictates otherwise.

Figure 1:
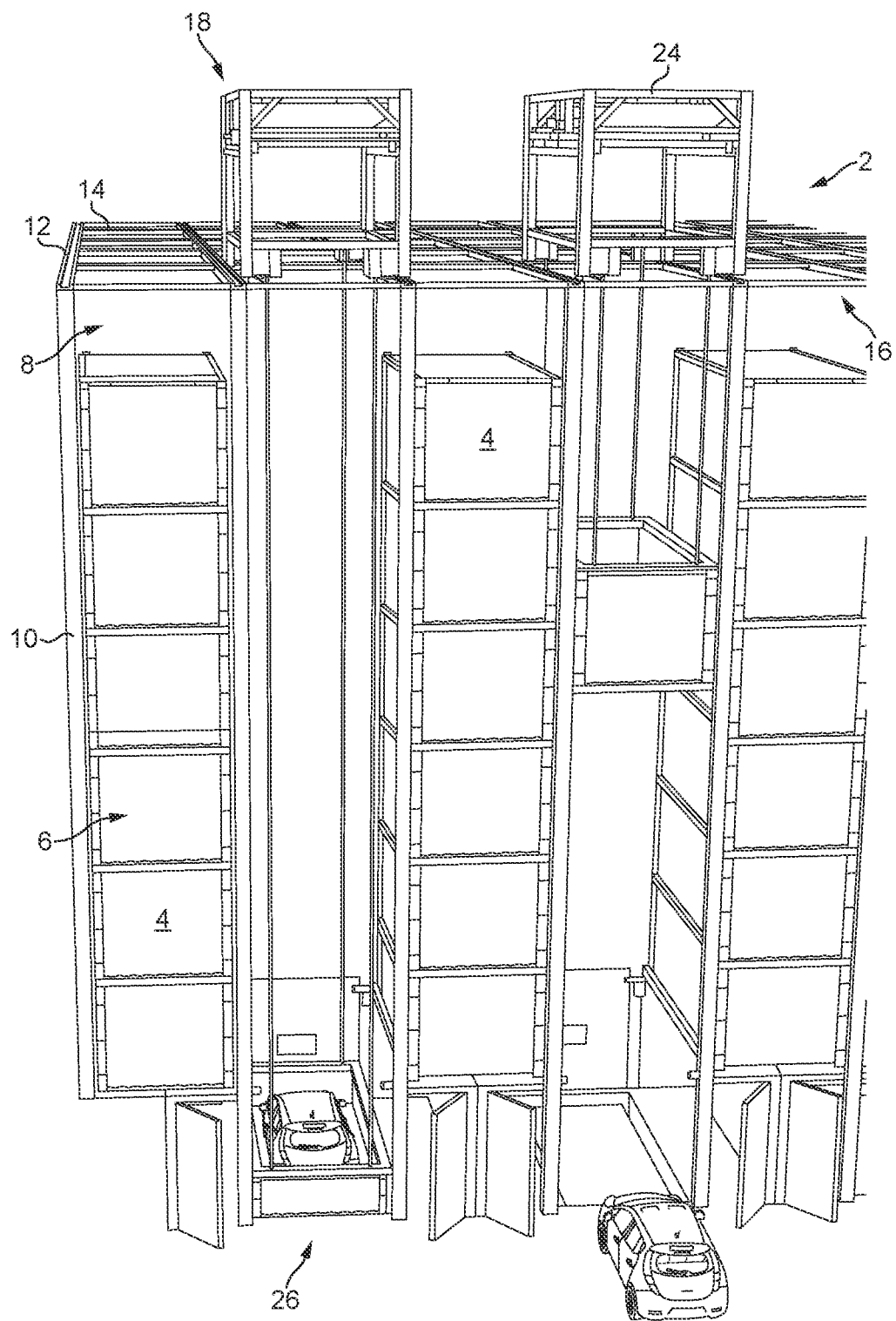
FIG. 1 is a schematic perspective view of a robotic parking system incorporating a load handling system according to an embodiment of the invention.

FIG. 1 shows an example application of an embodiment of a load handling system according to the invention within the context of a robotic parking system, generally designated by 2. A plurality of containers 4, some of which hold a load in the form of a vehicle, are stacked on top of one another to form stacks 6 arranged within a frame structure 8. For simplicity, only a representative section of the overall frame structure 8 comprising three stacks 6 is shown in FIG. 1, but it will be understood by the skilled reader that in practice the frame structure 8 would be significantly larger than this representative section, capable of accommodating many more stacks 6. The frame structure 8 comprises a series of upright members 10 that support horizontal members 12, 14. A first set of substantially parallel horizontal members 12 is arranged substantially perpendicularly to a second set of substantially parallel horizontal members 14 to form a horizontal grid structure 16 supported by the upright members 10.

The containers 4 are stacked between the upright members 10 such that the frame structure 8 guards against horizontal movement of the stacks 6 and guides vertical movement of the containers 4.

The top surface of the grid structure 16 includes rails or the like that support a plurality of robotic load handling device 18, only two of which are shown in FIG. 1. A first set of substantially parallel rails guide movement of the load handling devices 18 in a first direction (x) across the top of the frame structure 8, and a second set of substantially parallel rails, arranged substantially perpendicular to the first set of rails, guide movement of the load handling devices 18 in a second direction (y), the second direction being substantially perpendicular to the first direction. In this way, the rails allow movement of the load handling devices 18 in two dimensions in a substantially horizontal plane, so that a load handling device 18 can be moved into a position above any one of the stacks 6.

Each load handling device 18 comprises a body 24 arranged to travel in the first and second directions on the rails above the stacks 6. A first set of wheels (not shown), consisting of a pair of wheels on the front of the body 24 and a pair of wheels on the back of the body 24, are arranged to engage two adjacent rails of the first set of rails. Similarly, a second set of wheels (not shown), consisting of a pair of wheels on each side of the body 24, are arranged to engage with two adjacent rails of the second set of rails. Each set of wheels can be lifted and lowered respectively so that either the first or second set of wheels engage a respective set of rails at any one time.

When the first set of wheels is engaged with the first set of rails and the second set of wheels is lifted clear from the rails, the first set of wheels can be driven, by way of a drive mechanism (not shown), to move the load handling device 18 in the first direction. To move the load handling device 18 in the second direction, the first set of wheels is lifted clear of the rails and the second set of wheels is lowered into engagement with the second set of rails. The drive mechanism can then be used to drive the second set of wheels to achieve movement in the second direction.

In this way, the load handling devices 18 can move around the grid structure 16 above the stacks 6 according to instructions received from a storage and sortation control system (not shown), which is provided with means for identifying and monitoring which vehicle is in which container 4, and where in the stacks 6 the vehicles are located. Each load handling device 18 comprises a load handler for moving containers 4 vertically such that they can be transferred between the stacks 6 and a collection point 26. In use, the control system decides on the optimal position that a container 4 may be positioned within the stacks 6 based on the vehicle that it contains. If a newly arrived vehicle is not required for a long period of time, it may be advantageous for its container 4 to be placed underneath containers 4 holding vehicles that will be needed sooner. Therefore, the load handling devices 18 may move containers 4 already a stack 6 in order to create a storage position lower in the stack 6 to place the container 4 holding the newly arrived vehicle. Once a suitable storage position is created, the load handling device 18 is positioned on the grid structure 16 directly above the collection point 26 where it can lift the container 4 holding the newly arrived vehicle using the load handler. The container 4 is lifted to within the body 24 of the load handling device 18 and the load handling device 18 is moved to a position on the grid structure 16 immediately above the storage position where the container 4 is then lowered into position within the stack 6. If necessary, the other containers 4 are then placed back above the recently positioned container 4.

When a vehicle needs to be retrieved from a stack 6, a load handling device 18 is positioned above the relevant stack 6 and removes the topmost container 4. If the topmost container 4 holds the vehicle to be retrieved, the container 4 is moved by the load handling device 18 to the collection point 26 where it is eventually collected by the vehicle's owner. If the container 4 does not contain the desired vehicle, the load handling device 18 moves the container 4 to an alternative stack 6, and then returns to the first stack 6 so to retrieve the next container 4. This process continues until the container 4 holding the desired vehicle is retrieved, at which point it is then moved to the collection point 26. In this way, a high density of vehicle parking is achieved, whilst easy depositing and retrieval of vehicles is maintained.

Figure 2:
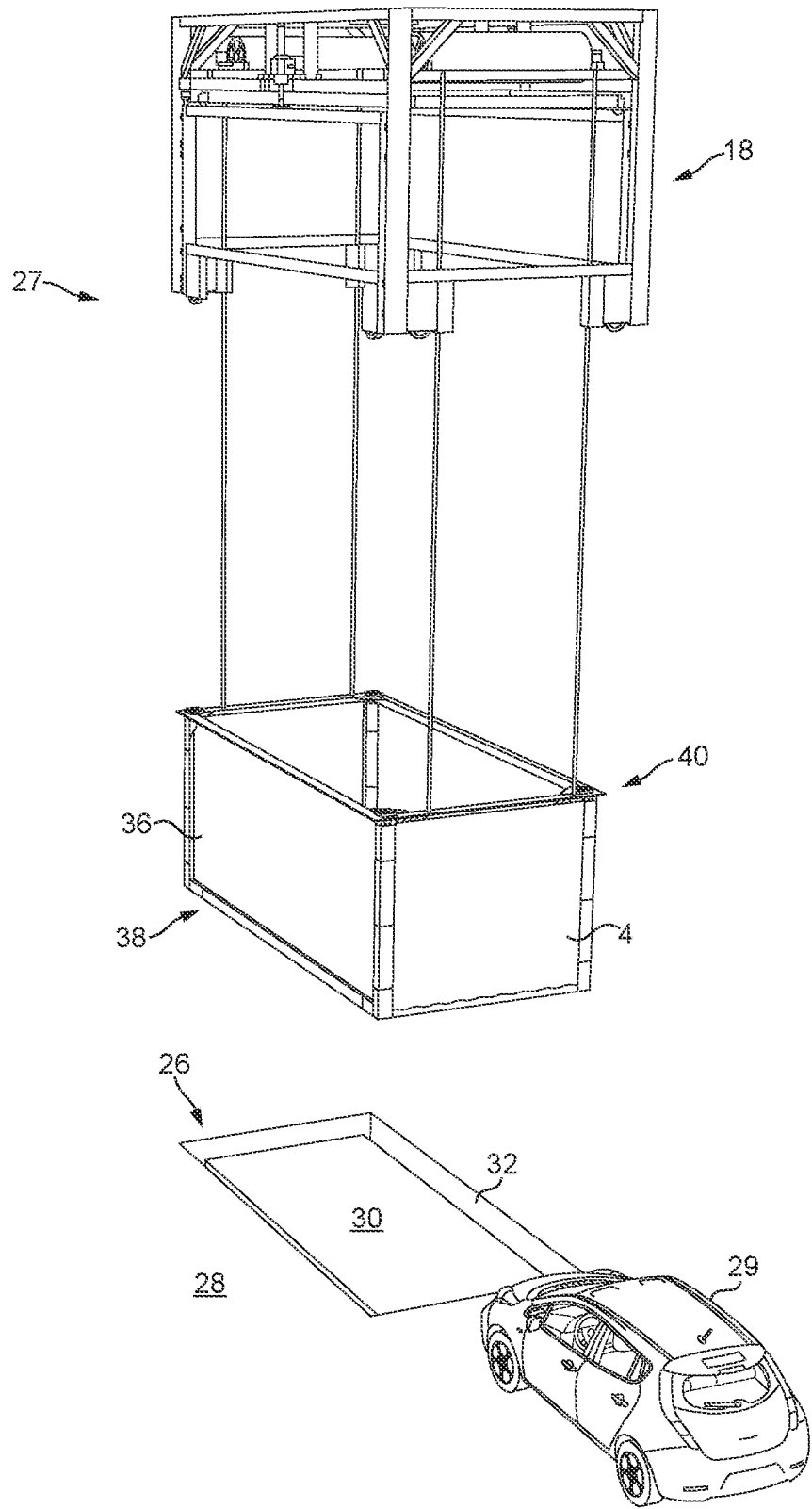
FIG. 2 is schematic perspective view of the load handling system of FIG. 1.

FIG. 2 shows a more detailed schematic view of the load handling system, generally designated by 27, comprising a base 28 and a container 4. A lifting means for carrying the container 4 in substantially vertical directions, which in this example application comprises the load handling device 18, also forms part of the load handling system 27. The base 28 defines the collection point 26 of the robotic parking system 2 and comprises a support station 30 and a cavity 32 that, in this example of the load handling system 27, extends around a perimeter of the support station 30.

When loading a vehicle 29 into the container 4 for storing in the robotic parking system 2, the vehicle 29 is held on the base 28 while the container 4 is lowered, by the load handling device 18, into the support station 30 in order to receive the vehicle 29. The container 4 comprises a load carrying platform 34 (not shown in FIG. 2) and a side wall 36 extending around at least part of the perimeter of the load carrying platform 34. In this embodiment of the container 4, the side wall 36 extends around the entire perimeter of the load carrying platform 34 but, in alternative embodiments, the side wall 36 might only extend along a pair of opposing sides of the load carrying platform 34, such as the longest sides. In such an embodiment, the load carrying platform 34 may comprise two direction control ramp surfaces associated with the other pair of opposing sides, preventing the vehicle 29 from inadvertently rolling off load carrying platform 34. The load carrying platform 34 and the side wall 36 are slidably engaged such that the side wall 36 is able to move with respect to the load carrying platform 34 between a first position, in which the load carrying platform 34 is held substantially at a lower end 38 of the side wall 36, and a second position, where the load carrying platform 34 is located substantially at or above an upper end 40 of the side wall 36. The side wall 36 may comprise guide members for guiding the relative movement between it and the load carrying platform 34. While the container 4 is suspended by the load handler of the load handling device 18, as shown in FIG. 2, the load carrying platform 34 is passively held at the lower end 38 of the side wall 36 under the force of gravity. The side wall 36 comprises a seating member (not shown) at its lower end 38 to support the load carrying platform 34, preventing it from moving beyond the lower end 38 of the side wall 36 and falling from the bottom of the container 4.

Figure 3A:
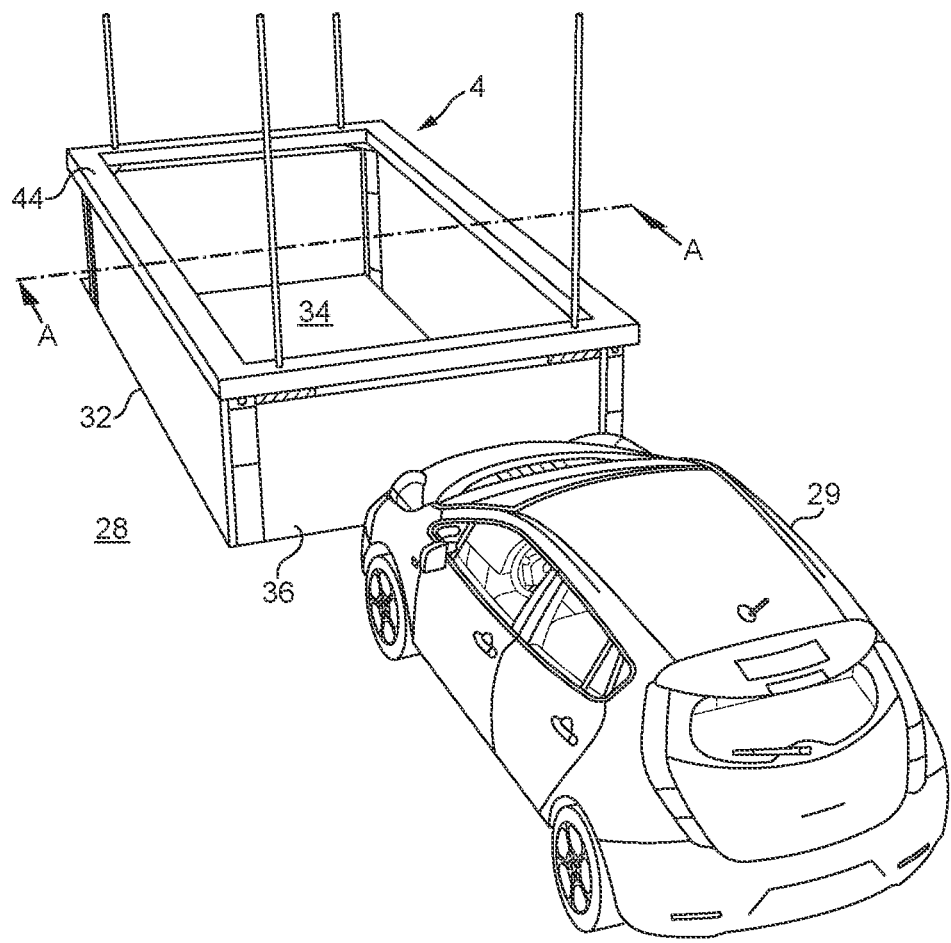
FIG. 3a is a schematic perspective view of a container of the load handling system of FIG. 1 partially received within a cavity of a base.
Figure 3B:
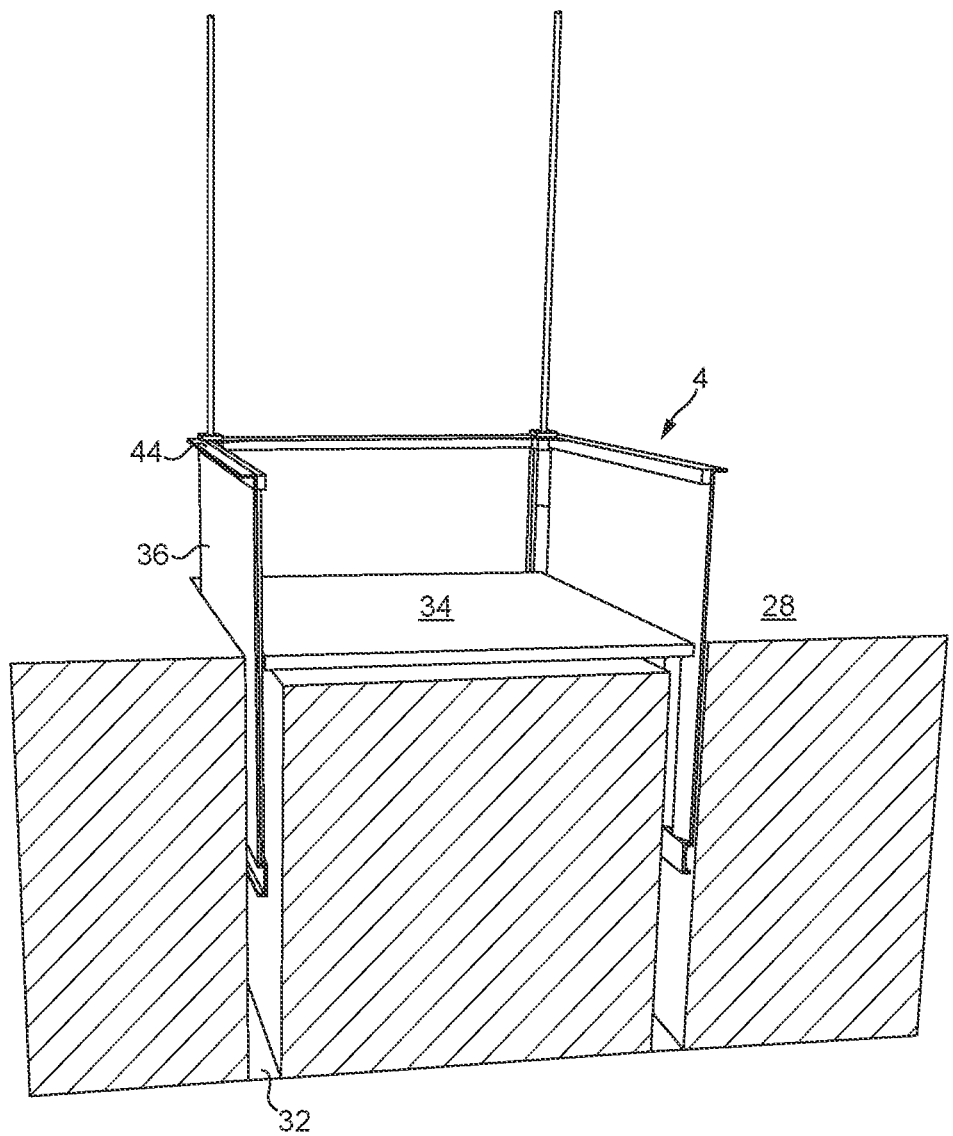
FIG. 3b is a schematic cross-sectional view of the container of FIG. 3a along line A-A.

With reference to FIG. 3a, the load handling device 18 continues to lower the container 4 so the load carrying platform 34 comes to rest on the support station 30, preventing any continued downward movement of the load carrying platform 34. From there, due to the sliding engagement between the side wall 36 and the load carrying platform 34, the side wall 36 enters the cavity 32 as the load handling device 18 continues to lower the container 4 beyond the support station 30, moving the side wall 36 from the first position, as shown in FIG. 3b.

Figure 4A:
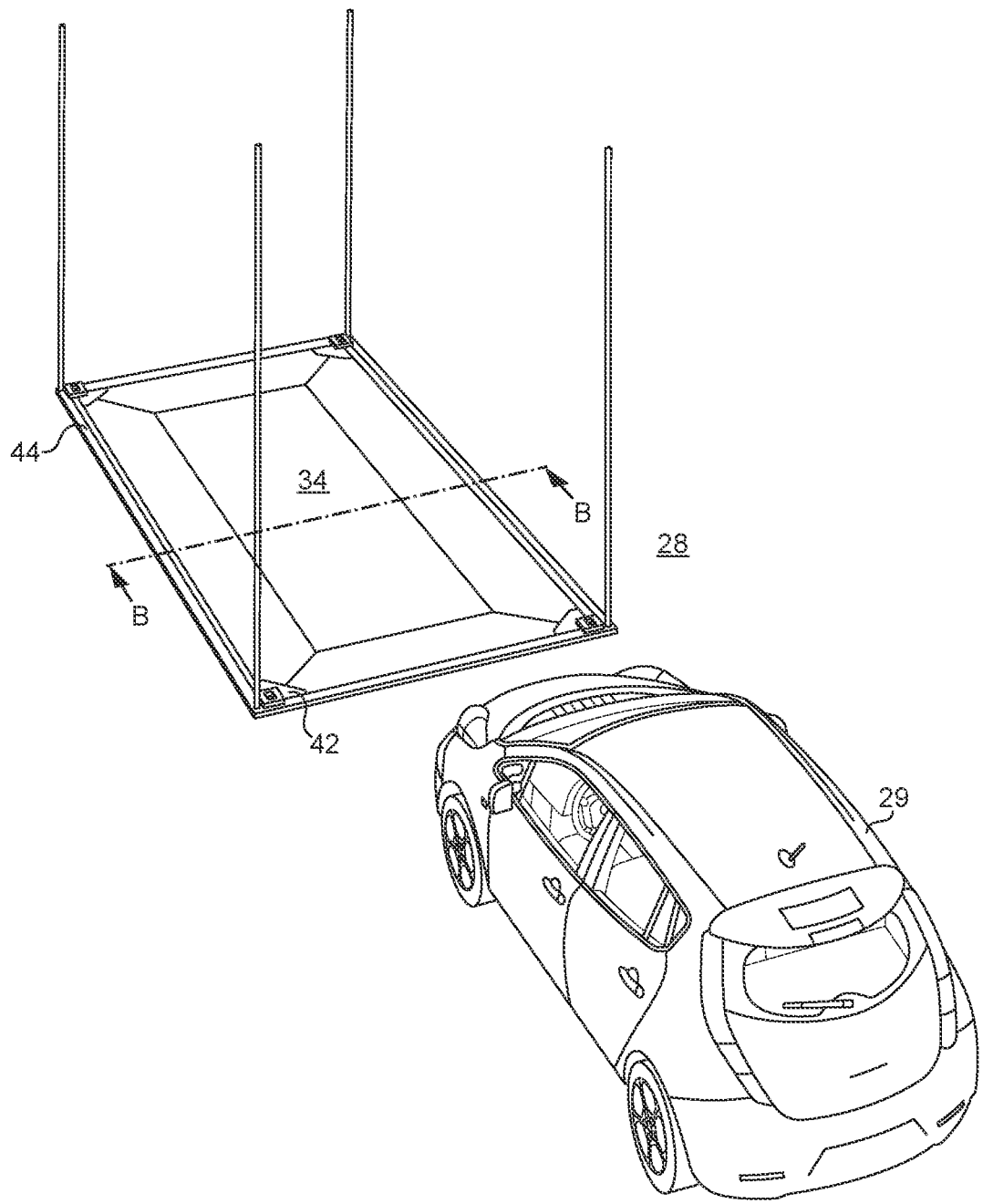
FIG. 4a is a schematic perspective view of the container of the load handling system of FIG. 1 fully received within the cavity of the base.
Figure 4B:
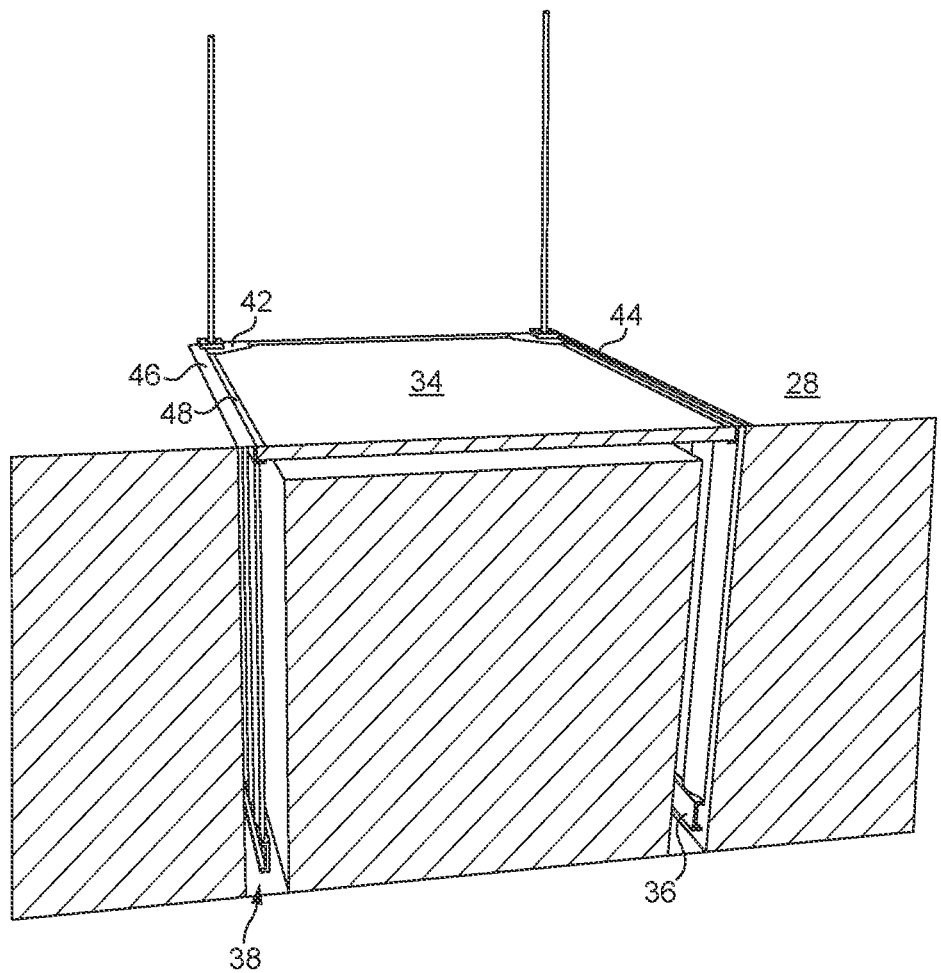
FIG. 4b is a schematic cross-sectional view of the container of FIG. 4a along line B-B.

Turning to FIGS. 4a and 4b, the load handling device 18 continues to lower the container 4 until the side wall 36 has moved to the second position, completing its downward movement. This embodiment of the container 4 comprises four corner brackets 42 located at the upper end 40 of the side wall 36. The corner brackets 42 overhang respective corners of the load carrying platform 34 and are configured to sit on the upper surface of the load carrying platform 34 during the lowering of the container 4 to hold the side wall 36 in the second position and prevent any further downward movement of the side wall 36 with respect to the load carrying platform 34. The corner brackets 42 are configured such that when they engage the upper surface of the load carrying platform 34 to hold the side wall 36 in the second position, the upper surface of the load carrying platform 34 and the upper end 40 of the side wall 36 are substantially coplanar, making it easier for the vehicle 29 to access the load carrying platform 34. This embodiment of the container 4 further comprises a frame 44 around the perimeter of the side wall 36. The frame 44 outwardly extends perpendicularly from the upper end 40 of the side wall 36 and is arranged to cover the opening of the cavity 32 when the side wall 36 is in the second position. When in this position, the underside of the frame 44 sits on the base 28, also preventing any further downward movement of the side wall 36 with respect to the load carrying platform 34 in combination with the corner brackets 42. In this embodiment of the container 4, the upper surface of the frame 44 includes a ramped section 46, leading up to the upper surface of the load carrying platform 34, improving access to the load carrying platform 34, together with a stepped section around the inner periphery of the side wall 36. The stepped section defines a mounting ledge or surface 48 configured to receive a side wall of another container, when that other container is placed upon the current container 4 within a stack 6, and guide the other container 4 into an appropriate stackable position with respect to the current container 4.

Figure 5:
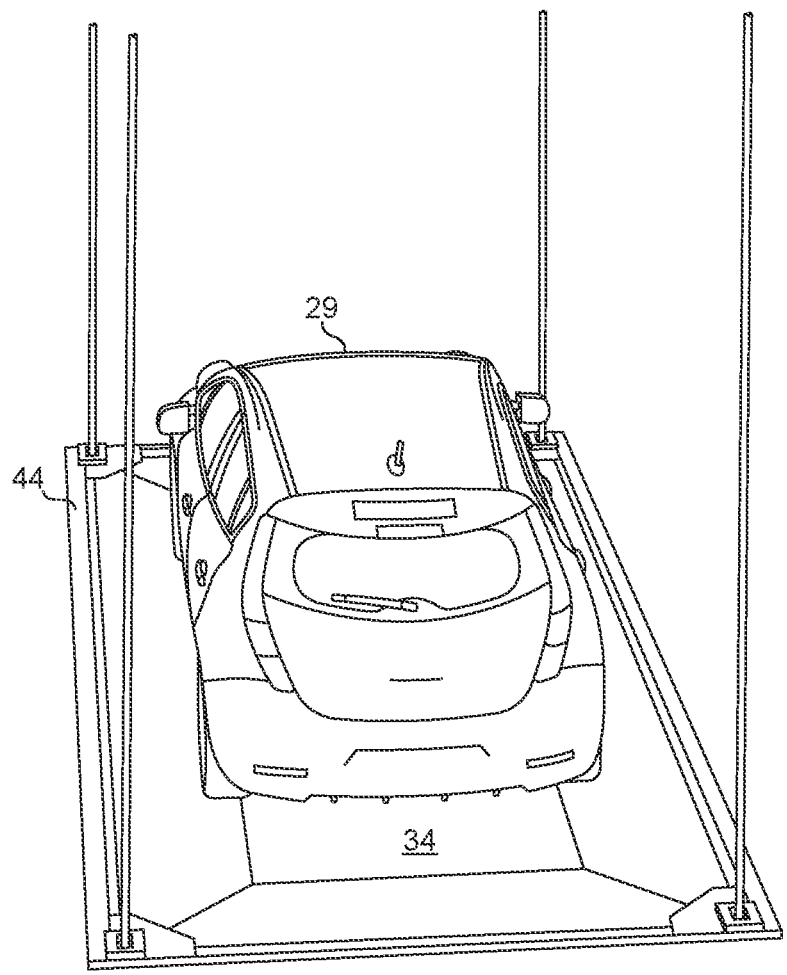
FIG. 5 is a schematic perspective view of a vehicle parked on a load carrying platform of the container of FIG. 4a; and, FIG. 6 is a schematic perspective view of the vehicle held within the container.
Figure 6:
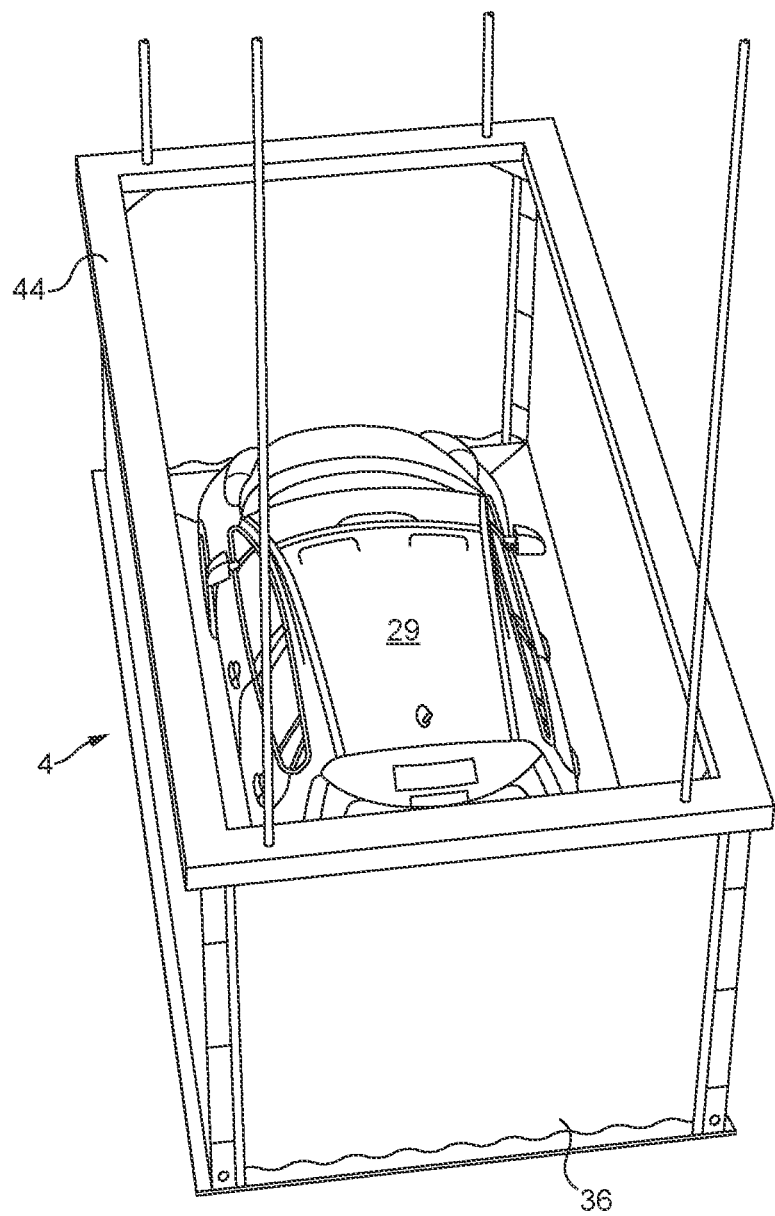

With the side wall 36 at the second position, the load carrying platform 34 is made accessible to the vehicle 29. Once the vehicle 29 has been moved onto the load carrying platform 34, as shown in FIG. 5, the load handling device 18 lifts the container 4 for storing in a stack 6. This lifts the side wall 36 out from the cavity 32, moving the side wall 36 from the second position while the load carrying platform 34 remains on the support station 30. As the load handling device 18 continues to lift the container 4, the first position is reached in which the load carrying platform 34 is held substantially at the lower end 38 of the side wall 36 and engages with the seating member. From here, the side wall 36 and load carrying platform 34 move in unison as the load handling device 18 continues to lift the container 4 into its body 24 for storing in the robotic parking system 2 as shown in FIG. 6.

The process is very similar when retrieving the vehicle 29 from the robotic parking system 2. The load handling device 18, having retrieved the container 4 holding the vehicle 29 from its storage location, lowers the container 4 onto the collection point 26 until the load carrying platform 34 rests on the support station 30. From here, the load handling device 18 continues to lower the container 4, moving the side wall 36 from the first position until it is substantially fully received within the cavity 32 having reached the second position. The vehicle 29 is then moved from the load carrying platform 34 making it accessible for another vehicle.

It will be appreciated by those skilled in the art that the present invention has been described in the context of a robotic parking system 2 by way of example only, and that other applications and a variety of alternative approaches may be adopted without departing from the scope of the invention as defined by the appended claims. For example, the container 4 has been described with various means for limiting the travel of the side wall 36 to the second position, such as the corner brackets 42 and frame 44. However, in other embodiments, the movement of the side wall 36 may instead be limited by the respective lengths of the cavity 32 and side wall 36. Specifically, the respective lengths can be arranged such that when in the second position, the lower end 38 of the side wall 36 sits on the bottom-most surface of the cavity 32, preventing further downward movement.

Moreover, the load handling system 27 may further comprise a deformable flap arranged to extend across at least part of the opening of the cavity 32, preventing debris or the like from entering the cavity 32 whilst allowing the side wall 36 to be lowered into the cavity 32.

The invention claimed is:
1. A load handling system comprising:
a container comprising:
a load carrying platform; and
a side wall extending around at least part of a perimeter of the load carrying platform, the side wall being configured to move with respect to the load carrying platform between a first position in which the load carrying platform is held substantially at a lower end of the side wall and a second position in which the load carrying platform is located substantially at or above an upper end of the side wall, the load handling system including:
- lifting means connectable to the side wall for carrying the container in a substantially vertical direction; and
- a base including:
  - a support station; and
  - a cavity configured to receive the side wall as the side wall moves from the first position to the second position when the lifting means lowers the container after the load carrying platform has been lowered onto the support station such that the load carrying platform will be accessible to a load positioned on the base.

2. A load handling system according to claim 1, wherein the side wall extends around an entire perimeter of the load carrying platform.

3. A load handling system according to claim 1, wherein the side wall extends along a first pair of opposing sides of the load carrying platform.

4. A load handling system according to claim 3, wherein the load carrying platform comprises:
- two direction control ramp surfaces, each direction control ramp surface being adjacent to a respective side of a second pair of opposing sides of the load carrying platform.

5. A load handling system according to claim 1, wherein the side wall comprises:
- a seating member against which the load carrying platform abuts to hold it at the lower end of the side wall.

6. A load handling system according to claim 1, wherein the side wall comprises:
- guide members for guiding relative movement between the sidewall and load carrying platform.

7. A load handling system according to claim 1, comprising:
- a deformable flap arranged to extend across at least part of an opening of the cavity.

8. A load handling system according to claim 1, wherein the container comprises:
- corner brackets at the upper end of the side wall, the corner brackets being configured and arranged to sit on an upper surface of the load carrying platform when the side wall is in the second position.

9. A load handling system according to claim 1, wherein the container comprises:
- a frame outwardly extending from the upper end of the side wall, the frame being arranged to cover an opening of the cavity when the side wall is in the second position.

10. A load handling system according to claim 9, wherein the frame is configured to extend over the opening of the cavity to sit on the base when the side wall is in the second position to prevent any further downward movement of the side wall with respect to the load carrying platform.

11. A load handling system according to claim 9, wherein the frame comprises:
- a ramped surface leading up to an upper surface of the load carrying platform.

12. A load handling system accordion to claim 9, wherein the frame comprises:
- a mounting surface configured to receive the lower end of another container side wall with the containers being configured to be stacked.

* * * * *